United States Patent [19]
Blaurock

[11] Patent Number: 5,211,483
[45] Date of Patent: May 18, 1993

[54] ROLLER BEARING ARRANGEMENT

[75] Inventor: Werner Blaurock, Niederwerrn, Fed. Rep. of Germany

[73] Assignee: Deutsche Star GmbH, Schweinfurt, Fed. Rep. of Germany

[21] Appl. No.: 752,093

[22] Filed: Aug. 29, 1991

[30] Foreign Application Priority Data

Sep. 3, 1990 [DE] Fed. Rep. of Germany ....... 4027890

[51] Int. Cl.⁵ .............................................. F16C 33/36
[52] U.S. Cl. .................................... 384/56; 384/565; 384/44
[58] Field of Search .................... 384/44, 56, 565, 569, 384/619

[56] References Cited

U.S. PATENT DOCUMENTS 1,280,621 10/1918 Anderson .
1328179 1/1920 E. Meier .
1443915 1/1923 V.A. Fynn .
1469991 10/1923 P.A.E. Armstrong .
3230018 1/1966 R.F. Stallman .

FOREIGN PATENT DOCUMENTS 301884 8/1916 Germany .
304992 2/1929 Geat Britain .
564273 9/1944 Great Britain .
1350681 12/1963 Germany .

Primary Examiner—Lenard A. Footland
Attorney, Agent, or Firm—Brumbaugh, Graves, Donohue & Raymond

[57] ABSTRACT

Rolls of roller bearings have in their axial middle portion a load-transmitting peripheral surface and on their axial end portions there are respective radially projecting and space-maintaining peripheral surfaces. Therefore, only the space-maintaining peripheral surfaces of adjacent rolls contact one another.

25 Claims, 3 Drawing Sheets

ROLLER BEARING ARRANGEMENT

BACKGROUND OF THE INVENTION

The invention relates to a roller bearing arrangement with bearing parts guided in relation to each other by at least one group of rolls, a roll having a roll axis and a load-bearing peripheral surface around the roll axis, the load-bearing peripheral surfaces of the rolls furthermore bearing on respective load-bearing roll races of the two bearing parts and said load bearing roll races extenting substantially at right angles to the roll axes, spacer means being provided in order to prevent mutual contact between the load-bearing peripheral surfaces of adjacently disposed rolls.

STATEMENT OF PRIOR ART

Such roller bearing arrangements are known and are used both in pivot bearings and also in linear bearings. Known from DE-PS 31 23 323 is a roller bearing arrangement of the type mentioned at the outset, between two relatively rotatable bearing parts, additional spacer elements of a smaller diameter than the peripheral surfaces of the rolls being inserted between end plates riveted onto the roll ends.

In the case of another embodiment of a linear bearing known from DE-OS-33 23 536, there are disposed axially adjacent one another on one roll two load-bearing peripheral faces which are connected by a reduced diameter journal. In such a case, the load-transmitting peripheral surfaces of successive rolls are connected by additional connecting members like chain links which keep spaced apart the load-bearing peripheral surfaces of adjacent rolls.

In addition to the rolls, separate spacer elements are needed in both cases and these render manufacture of the rolls and installation of the roller bearing arrangement difficult.

PROBLEM OF THE INVENTION

The invention is based on the problem of so designing a roller bearing arrangement of the type mentioned at the outset that it can be produced relatively easily.

SUMMARY OF THE INVENTION

In order to solve this problem, a roller bearing arrangement with bearing parts is guided in relation to each other by at least one group of rolls. A roll has a roll axis and a load-bearing peripheral surface around the roll axis. The load-bearing peripheral surfaces of the rolls furthermore bear on respective load-bering roll races of the two bearing parts. The load-bearing roll races extend substantially at right-angles to the roll axes. Spacer means are provided in order to prevent mutual contact between the load-bearing peripheral surfaces of adjacently disposed rolls. The load-bearing peripheral surface of a roll is disposed in the axial direction of the roll between two space-maintaining peripheral surfaces of said roll which project in a radial direction beyond the load-bearing peripheral surface and which are situated outside the load-bearing roll races of the bearing parts.

Where the roller bearing arrangement according to the invention is concerned, the peripheral surfaces can be kept at a very closely dimensioned distance from one another so that the bearing capacity (load number) is not substantially reduced by the maintenance of the spaces between the load-bearing peripheral surfaces. Assembly remains extremely simple because no loose spacers are required beside the rolls themselves. Cylinder rolls are preferably of symmetrical construction in relation to a median plane at right-angles to their axis so that there is no possibility of incorrect assembly due to confusion of the roll ends.

For a given load number, the space required by the rolls is not substantially increased in comparison with purely cylindrical rolls if the axial width of a space-maintaining peripheral surface is substantially less than the axial width of the load-bearing peripheral surface, for example less than 40% and preferably less than 20% of the axial width of the load-bearing peripheral surface or if the radial projection of the space-maintaining peripheral surfaces amounts to less than 30% and preferably less than 10% of the radius of the load-bearing peripheral surface.

A particularly low-friction and low-noise roll movement with reduced bearing wear is achieved if the sliding friction coefficient between space-maintaining peripheral surfaces of adjacent rolls is less than the theoretical sliding friction coefficient between two load bearing peripheral surfaces; a further improvement is achieved if at least one roll end face which is substantially at right-angles to the axis is at least partially coated with a slip-encouraging coating and has this coating sliding on a thrust surface which is situated opposite the said end face.

In order to facilitate manufacture of the rolls, the slip-encouraging coating on a roll end face is preferably constructed cohesively with the material of a space-maintaining peripheral surface.

The space-maintaining peripheral surface may be formed by a coating adhering to the material of the roll and preferably applied for instance by dipping, spraying, chemical treatment or Teflon ® coating or by snap-fitting a pot-shaped cap onto a retaining profile on the roll, the cap shell constituting the space-maintaining peripheral surface.

In accordance with a further embodiment, the space-maintaining peripheral surface is constituted by the peripheral surface of a disc fixed to the end face of the roll.

In order to achieve particularly favourable sliding properties in the roll end faces on associated thrust faces of the bearing parts, it is possible to provide in at least one roll end face at least one recess to accommodate lubricating means; alternatively, on at least one roll end face there may be a central projection or an annular projection to provide a sliding bearing on a thrust surface. A further reduction in friction between adjacent rolls is achieved if the space-maintaining peripheral faces when viewed in a sectional plane containing their axis are of convex construction so that the space-maintaining peripheral surfaces of adjacent rolls touch one another only at one point. The wear and tear and the rolling noise of the bearing are particularly low.

The roller bearing arrangement according to the invention can be used both in rotary roller bearings in which the bearing parts are constituted by annular parts rotatable in relation to each other and also in linear roller bearings in which the bearing parts are constituted by sliding parts adapted for linear movement along an axis of displacement in relation to one another.

The roller bearing arrangement in a linear roller bearing is preferably so constructed that on a first of the sliding parts there is at least one closed roll orbit with a row of load transmitting rolls parallel with the axis of displacement and with a row of rolls running in reverse, the rolls of the load transmitting row of rolls being disposed between respective load-bearing roll races of the first siding part and a load-bearing roll race of a second of the sliding parts, the returning row of rolls being guided in a return guide on the first sliding part.

The rolls of the load transmitting row of rolls are preferably guided in that their end faces bear on thrust surfaces of at least one of the sliding parts so that they are orientated in the direction of their longitudinal axes in respect of one another.

The rolls of the returning row of rolls which do not transmit any load preferably run in a guide channel formed on the first sliding part, and in order to reduce the contact areas and thus the friction the rolls have only the space-maintaining peripheral surfaces bearing on the boundary surfaces of this guide channel while the load-bearing peripheral surfaces of the rolls are not in contact with the boundary surfaces.

A particularly high loading capacity of a roller bearing arrangement according to the invention can be achieved in a linear roller bearing while at the same time the overall height of the linear roller bearing is kept to the minimum if the second sliding part consists of a guide rail with a bottom surface, a top surface, two lateral surfaces and a plane of symmetry between the two lateral surfaces, a trapezoidal slot is machined into each of the two lateral surfaces The surfaces of the trapezoidal slot which converge towards the plane of symmetry form the load-bearing roll races of altogether four roll orbits. The first sliding part consists of, engaging around the guide rail, a U-shaped bearing member with a web portion and two flange portions, there being on the inner surfaces of the flange portions which are opposite the lateral faces of the guide rail load-bearing roll races of the bearing member which are disposed substantially parallel with the load-bearing roll races of the guide rail In the case of such a roller bearing arrangement, the trapezoidal grooves for each load-bearing roll race of the guide rail may have at least one notch to accommodate the space-maintaining peripheral surfaces of the rolls; furthermore, there may be on the inner surfaces of the flange portions of the bearing member for the rolls of each load-transmitting row of rolls at least one notch for the space-maintaining peripheral faces of the rolls; consequently, the space-maintaining peripheral faces of the rolls are kept free in relation to the displaceable bearing parts and do not have to bear any load.

On one and the same retaining web it is possible in each case to provide respective thrust surfaces for the two load-transmitting rows of rolls associated with a flange portion.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be described in greater detail below by reference to the forms of embodiment as represented in the drawings, wherein.

DESCRIPTION OF PREFERRED EMBODIMENTS

Figure 1:
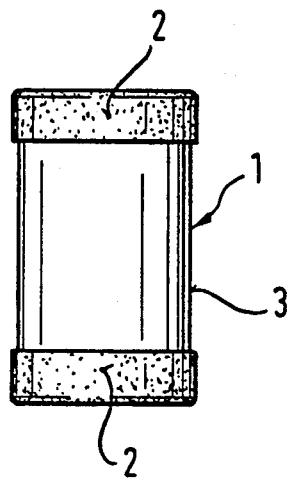
FIG. 1 shows a roll according to the invention.

FIG. 1 shows a cylindrical roll 1 of which the axial end portions have space-maintaining peripheral surfaces 2 of slightly larger diameter than their axial middle portion which forms a load-bearing peripheral surface 3. The oversize of the space-maintaining peripheral surfaces 2 can be achieved by the following measures: dipping, spraying, chemical treatment, Teflon(R) coating, snap-fitment of synthetic plastics caps, etc. The axial length of the coated space-maintaining peripheral surfaces 2 is kept as short as possible in proportion to the axial length of the load-bearing peripheral surface 3 so that almost no loss of bearing capacity occurs in comparison with conventional rolls of the same overall length.

Figure 2:
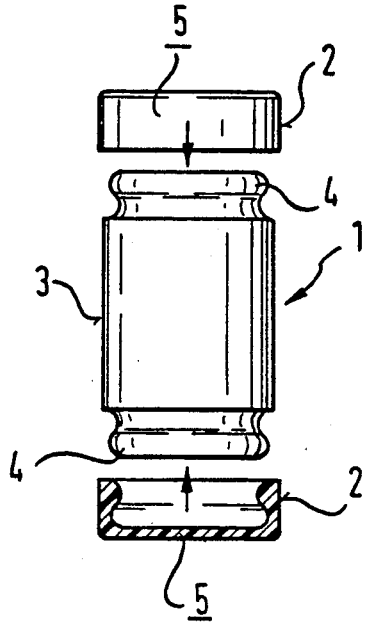
FIGS. 2a shows a roll according to the invention prior to assembly.
Figure 3:
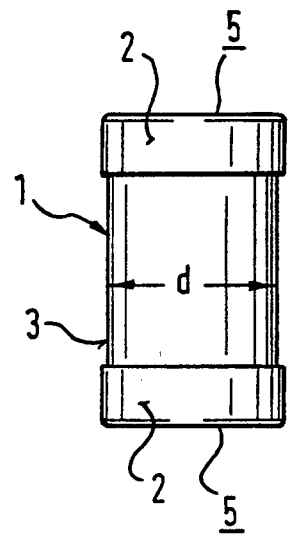
FIG. 3 shows a roll according to the invention as shown in FIG. 2 but after assembly.

FIG. 2 shows an embodiment of roll 1 on the axial ends of which synthetic plastics caps 5 are snap-fitted. FIG. 3 shows that the synthetic plastics caps 5 are slightly oversized in relation to the roll diameter d. This oversize ensures that rolls 1 adjacent one another in a roller bearing arrangement contact one another only on the space-maintaining peripheral surfaces 2. By reason of this small contacting surface and the corresponding choice of materials, friction behaviour can be considerably improved so that the rolls cannot suffer any damage and so that bearing temperature is reduced particularly at high bearing running speeds.

Figure 4A:
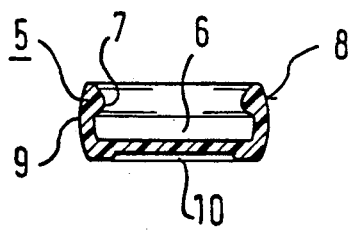
FIG. 4a shows an axial cross-section through a synthetic plastics cap.
Figure 4B:
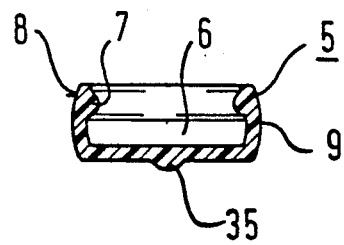
FIG. 4b shows an axial section through another embodiment of synthetic plastics cap.

FIGS. 4a and 4b each show an axial section through a synthetic plastics cap 5. The synthetic plastics cap 5 has an inner cavity 6 projecting from the inner periphery of which there is an encircling bead 7 so that a retaining profile 4 on the synthetic plastics cap 5 allows the cap to be snap-fitted on the axial end of a roll 1 (see FIG. 2). The peripheral surface 8 of the cap 5 is convexly constructed so that there is only a punctiform contact at the location 9 between the individual rolls 1. In order to improve the friction behaviour on axial thrust faces of a roller bearing, there is on the end face of the synthetic plastics cap 5 shown in FIG. 4a a recess 10 to accommodate lubricating means. The synthetic plastics cap 5 shown in FIG. 4b has a central projection 35 instead of the recess 10. By virtue of the fact that with this embodiment the point of contact with the axial thrust face of a roller bearing is on the axis of rotation of the roll 1, the friction at this location is minimized. The synthetic plastics cap 5 may also take the form of a flat disc which is fixed on the end faces of the roll 1.

Figure 5A:
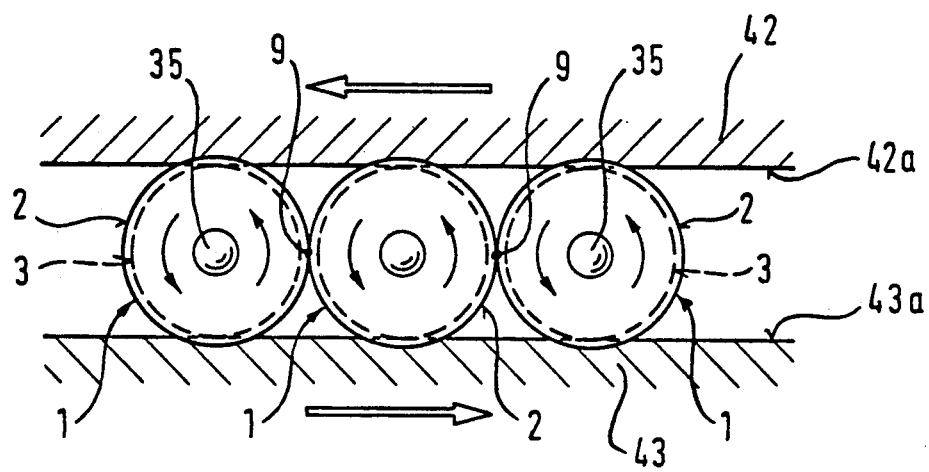
FIG. 5a is a diagram showing the disposition of the rolls between two bearing parts, viewed in the axial direction of the rolls.
Figure 5B:
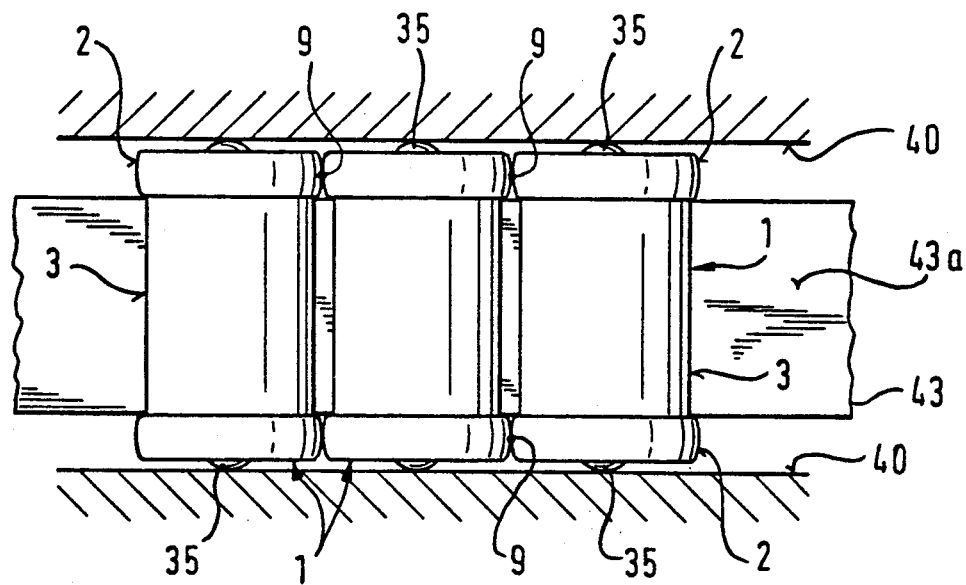
FIG. 5b is a diagram showing the disposition of the rolls between two lateral thrust faces.

As FIGS. 5a and 5b show, the rolls 1 run in a roller bearing in such a way that they rotate in opposite directions at their points of contact 9. The space-maintaining peripheral surfaces 2 project in a radial direction beyond the load-bearing peripheral surfaces 3 which rest on load-bearing roll races 42a, 43a of bearing parts 42, 43 and prevent contact between load-bearing peripheral surfaces 3 of neighbouring rolls 1. The rolls only contact one another at the punctiform contact points 9 on the space-maintaining peripheral surfaces 2. By virtue of the small contact area—occasioned by the oversize of the space-maintaining peripheral surfaces 2—reciprocal friction and thus wear and tear are reduced. In addition, the running behaviour is improved and the running noise is reduced by the prevention of mutual metal contact. As FIG. 5b shows, the space-maintaining peripheral surfaces 2 are disposed axially outside the load-bearing roll race 43a. The rolls 1 contact axial thrust faces 40 on the roller bearing solely by means of the central projections 35 on the roll end faces.

Figure 6:
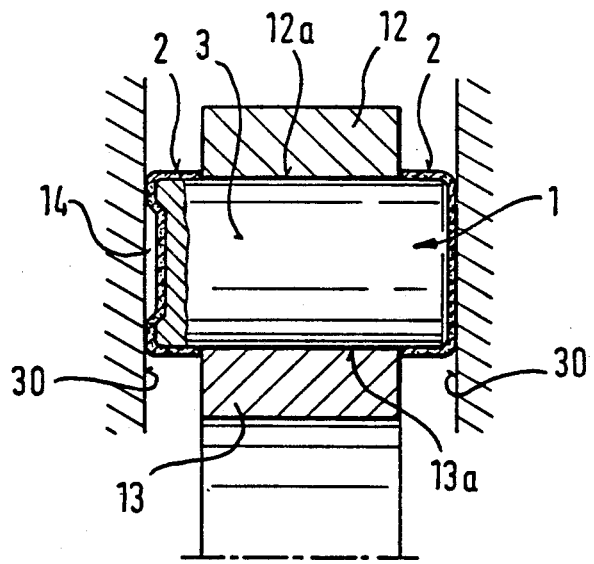
FIG. 6 is a partial cross-section through a radial bearing with a roll.

FIG. 6 shows a cylindrical roller bearing with an outer ring 12, an inner ring 13, load-bearing roll races 12a and 13a, axial thrust surfaces 30 and a roll 1. On the space-maintaining peripheral faces 2 of the roll 1, a friction reducing coating has been applied by dipping or the like. The left-hand end of the roll 1 shows an embodiment in which the roll 1 has a recess 14 which is still present after the coating process, so that the endface friction of the rolls on the axial thrust surfaces 30 on which the rolls are axially guided is reduced. This is achieved in that a lubricating means is present in the recess 14 and during running this lubricating means is passed outwards and reduces friction. By virtue of the fact that the individual rolls 1 contact one another only on a very small contact location, virtually the same advantages are achieved as in the case of a cage being used, an additional advantage residing in the fact that by reason of the very small distance between the individual rolls 1, more load-bearing rolls 1 can be accommodated.

Figure 7:
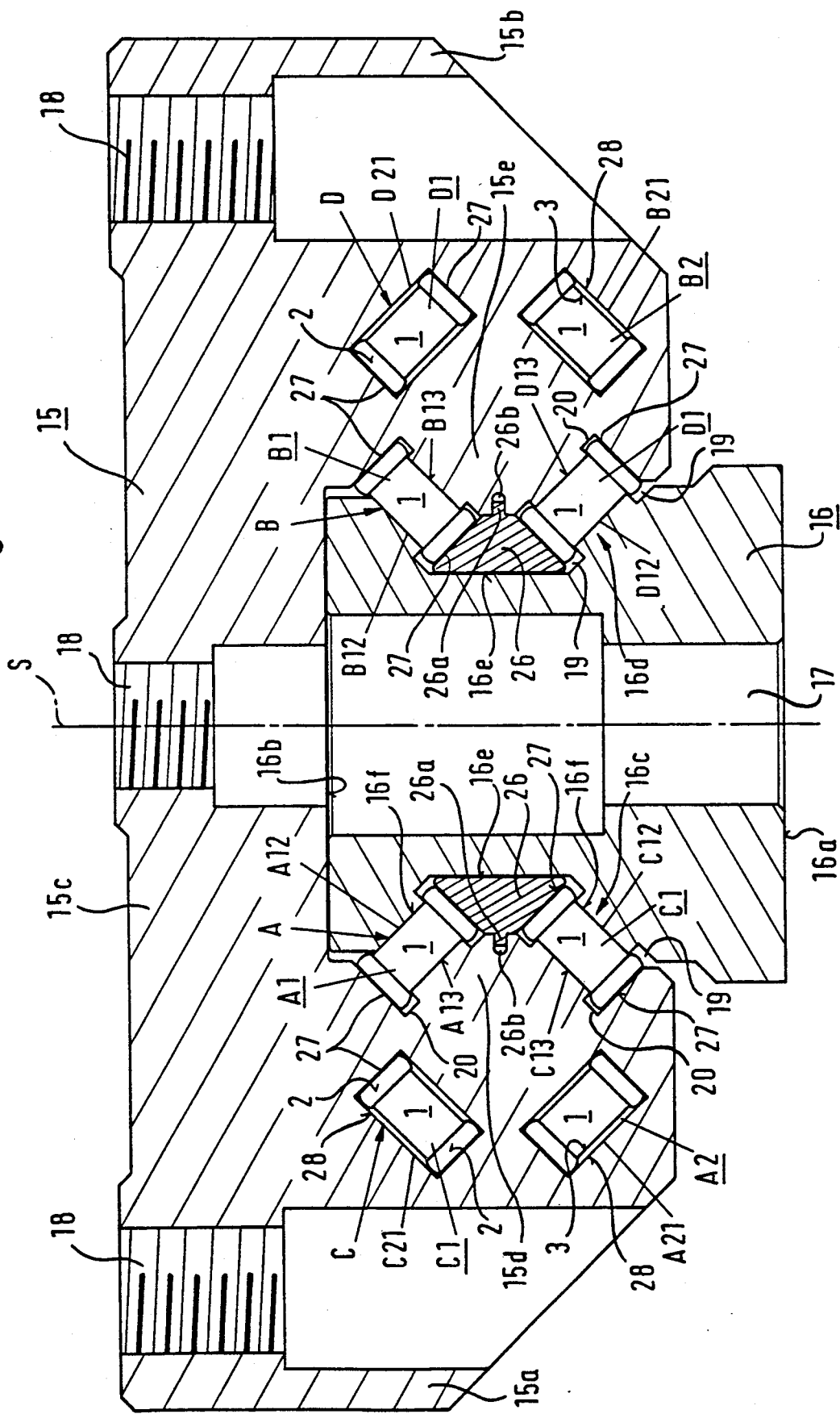
FIG. 7 shows a cross-section through a linear bearing with four roll orbits.

The construction of the linear bearing shown in FIG. 7 corresponds in its basic principles to the construction known from DE-OS P 36 20 571. Therefore, FIG. 7 only shows the innovations according to the invention. In principle, these can also be applied to other constructions.

Shown as a first sliding part in FIG. 7 is a bearing member 15 which is displaceably guided in its longitudinal direction on a rail 16 which is the second sliding part. The rail 16 is bolted to the supporting surface through central bores 17. The rail 16 has a bottom surface 16a bearing on the underlying surface, a top surface 16b which is opposite the bottom surface and two lateral surfaces 16c, 16d which connect the surfaces 16a, 16b.

At right-angles to the bottom surface 16a in the middle of the two lateral surfaces 16c, 16d, there is in the longitudinal direction of the bearing a plane of symmetry S for the linear bearing. Fixing of the bearing member 15 on a connecting part, not shown, for example a machine tool slide, is accomplished by means of bolt connections with fixing bores 18. As this drawing shows, the bearing member 15 comprises two flange portions 15a, 15b accommodating roll races A,C; B,D and a web portion 15c connecting these flange portions 15a, 15b.

The flange portions 15a, 15b accommodating the four roll races A, B, C, D are so connected to the web portion 15c that the bearing member 15 engages in a U-shape around the rail 16. The four roll races A, B, C, D each comprise a load-transmitting row of rolls A1, B1, C1, D1 extending in the longitudinal direction of the rail; these rows of rolls run on four surfaces 16f on respective trapezoidal grooves 16e in the two lateral faces 16c, 16d of the rail 16, which converge towards the plane of symmetry S; the surfaces form load-bearing roll races A12, B12, C12, D12; furthermore, each roll orbit comprises a return row of rolls A2, B2, C2, D2 which are guided in return channels A21, B21, C21, D21 within the bearing member 15. The load-transmitting roll rows A1, B1, C1, D1 and the return roll rows A2, B2, C2, D2 are connected to one another by rows of arcuate rollers, not shown. The resulting endless roll orbits A, B, C, D permit the longitudinal movement of the mutually displaceable parts 15, 16 which can be connected for instance to a machine tool slide or a machine tool bed. The load-transmitting rows of rolls A1, B1, C1, D1 are furthermore guided on load-bearing roll races A13, B13, C13, D13 of the bearing member 15 and on supporting webs 26. The load-bearing roll races A13, B13, C13, D13 are machined in inner faces 15d, 15e of the flange portions 15a, 15b of the bearing member 15 which are opposite the lateral faces 16c, of the rail 16 and they are disposed substantially parallel with the load-bearing roll races A12, B12, C12, D12 of the guide rail 16. Each supporting web 26 is secured over its entire length by a spring 26a which engages a corresponding groove 26b in the bearing member 15 and is attached to end plates, not shown, in which are guided the rows of arcuate rolls, not shown. The rolls 1 of each load-transmitting row of rolls A1, B1, C1, D1 are in each case guided between a supporting surface 27 of one of the flange portions 15a, 15b of the bearing member 15 and a further supporting surface 27 of one of the supporting webs 26. The load-bearing roll races A12, B12, C12, D12 machined into the rail 16 are in each case provided with notches 19 and the load-bearing roll races A13, B13, C13, D13 which are machined into the bearing member 15 are in each case provided with notches 20 to accommodate the space-maintaining peripheral surfaces 2 of the rolls 1 so that the space-maintaining peripheral surfaces 2 do not transmit any load. In the reverse movement channels A21, B21, C21, D21 the rolls 1 have the space-maintaining peripheral surfaces 2 bearing on boundary surfaces 28 of the reverse-movement channels, the load-bearing peripheral surfaces 3 having no contact with the boundary surfaces 28. By using rolls 1 which have central projections 35 on their axial end faces, friction on the axial thrust faces 27 for the rolls 1 is additionally reduced. An improvement in friction behaviour is also achieved by the use of rolls 1 which have lubricant pockets (recesses 10, 14). The advantageous running properties of such a bearing have already been described in connection with FIGS. 5a, 5b.

Specific forms of embodiment of the invention have been represented and described in order to illustrate the use of the principles of the invention. Of course, the invention can also be realized in other ways without departing from these principles.

The reference numbers in the claims serve only for facilitation of understanding and are not to be understood as a limitation.

What is claimed is:

1. A roller bearing arrangement with bearing parts (12, 13; 15, 16; 42, 43) guided in relation to each other by at least one group of rolls (1), each roll (1) having a roll axis and a load-bearing peripheral surface (3) around the roll axis, the load-bearing peripheral surfaces (3) of the rolls (1) futhermore bearing on respective load-bearing roll races (12a, 13a; A12, B12, C12, D12; A13, B13, C13, D13; 42a, 43a) of the two bearing parts (12, 13; 15, 16; 42, 43), said load-bearing roll races extending substantially at right angles to the roll axes, spacer means (2) being provided in order to prevent mutual contact between the load-bearing peripheral surface (3) of adjacently disposed rolls (1), said load-bearing peripheral surface (3) of each roll (1) being disposed in the axial direction of the roll between two space-maintaining peripheral surfaces (2) of said roll (1) which project in a radial direction beyond the load-bearing peripheral surface (3) and which are situated outside the load-bearing roll races (12a, 13a; A12, B12, C12, D12; A13, B13, C13, D13; 42a, 43a), wherein the sliding friction coefficient between the space-maintaining peripheral surfaces (2) of adjacent rolls (1) is less than the theoretical sliding friction coefficient between two load-bearing surfaces (3) of the rolls.

2. A roller bearing arrangement with bearing parts (12, 13; 15, 16; 42, 43) guided in relation to each other by at least one group of rolls (1), each roll (1) having a roll axis and a load-bearing peripheral surface (3) around the roll axis, the load-bearing peripheral surfaces (3) of the rolls (1) futhermore bearing on respective load-bearing roll races (12a, 13a; A12, B12, C12, D12; A13, B13, C13, D13; 42a, 43a) of the two bearing parts (12, 13; 15, 16; 42, 43), said load-bearing roll races extending substantially at right angles to the roll axes, spacer means (2) being provided in order to prevent mutual contact between the load-bearing peripheral surface (3) of adjacently disposed rolls (1), said load-bearing peripheral surface (3) of each roll (1) being disposed in the axial direction of the roll between two space-maintaining peripheral surfaces (2) of said roll (1) which project in a radial direction beyond the load-bearing peripheral surface (3) and which are situated outside the load-bearing roll races (12a, 13a; A12, B12, C12, D12; A13, B13, C13, D13; 42a, 43a), wherein at least one substantially axially perpendicular end face of each roll (1) is at least partially coated with a slip-encouraging coating by which it bears in sliding fashion on an oppositely disposed thrust surface (27; 30, 40).

3. A roller bearing arrangement according to claim 2, characterized in that the slip-encouraging coating on a roll end face is constructed cohesively with the material of a space-maintaining peripheral surface (2).

4. A roller bearing arrangement with bearing parts (12, 13; 15, 16; 42, 43) guided in relation to each other by at least one group of rolls (1), each roll (1) having a roll axis and a load-bearing peripheral surface (3) around the roll axis, the load-bearing peripheral surfaces (3) of the rolls (1) futhermore bearing on respective load-bearing roll races (12a, 13a; A12, B12, C12, D12; A13, B13, C13, D13; 42a, 43a) of the two bearing parts (12, 13; 15, 16; 42, 43), said load-bearing roll races extending substantially at right angles to the roll axes, spacer means (2) being provided in order to prevent mutual contact between the load-bearing peripheral surface (3) of adjacently disposed rolls (1), said load-bearing peripheral surface (3) of each roll (1) being disposed in the axial direction of the roll between two space-maintaining peripheral surfaces (2) of said roll (1) which project in a radial direction beyond the load-bearing peripheral surface (3) and which are situated outside the load-bearing roll races (12a, 13a; A12, B12, C12, D12; A13, B13, C13, D13; 42a, 43a), wherein a space-maintaining peripheral surface (2) is formed by a coating adhering to the material of each roll (1).

5. A roller bearing arrangement with bearing parts (12, 13; 15, 16; 42, 43) guided in relation to each other by at least one group of rolls (1), each roll (1) having a roll axis and a load-bearing peripheral surface (3) around the roll axis, the load-bearing peripheral surfaces (3) of the rolls (1) futhermore bearing on respective load-bearing roll races (12a, 13a; A12, B12, C12, D12; A13, B13, C13, D13; 42a, 43a) of the two bearing parts (12, 13; 15, 16; 42, 43), said load-bearing roll races extending substantially at right angles to the roll axes, spacer means (2) being provided in order to prevent mutual contact between the load-bearing peripheral surface (3) of adjacently disposed rolls (1), said load-bearing peripheral surface (3) of each roll (1) being disposed in the axial direction of the roll between two space-maintaining peripheral surfaces (2) of said roll (1) which project in a radial direction beyond the load-bearing peripheral surface (3) and which are situated outside the load-bearing roll races (12a, 13a; A12, B12, C12, D12; A13, B13, C13, D13; 42a, 43a), wherein a space-maintaining peripheral surface (2) is formed by a shell of a pot-shaped cap (5).

6. A roller bearing arrangement according to claim 5, characterised in that the pot-shaped cap (5) is snap-fitted onto a retaining profile (4) on the roll (1).

7. A roller bearing arrangement with bearing parts (12, 13; 15, 16; 42, 43) guided in relation to each other by at least one group of rolls (1), each roll (1) having a roll axis and a load-bearing peripheral surface (3) around the roll axis, the load-bearing peripheral surfaces (3) of the rolls (1) futhermore bearing on respective load-bearing roll races (12a, 13a; A12, B12, C12, D12; A13, B13, C13, D13; 42a, 43a) of the two bearing parts (12, 13; 15, 16; 42, 43), said load-bearing roll races extending substantially at right angles to the roll axes, spacer means (2) being provided in order to prevent mutual contact between the load-bearing peripheral surface (3) of adjacently disposed rolls (1), said load-bearing peripheral surface (3) of each roll (1) being disposed in the axial direction of the roll between two space-maintaining peripheral surfaces (2) of said roll (1) which project in a radial direction beyond the load-bearing peripheral surface (3) and which are situated outside the load-bearing roll races (12a, 13a; A12, B12, C12, D12; A13, B13, C13, D13; 42a, 43a), wherein at least one roll end face has at least one recess (10, 14) to accommodate a lubricating means.

8. A roller bearing arrangement with bearing parts (12, 13; 15, 16; 42, 43) guided in relation to each other by at least one group of rolls (1), each roll (1) having a roll axis and a load-bearing peripheral surface (3) around the roll axis, the load-bearing peripheral surfaces (3) of the rolls (1) futhermore bearing on respective load-bearing roll races (12a, 13a; A12, B12, C12, D12; A13, B13, C13, D13; 42a, 43a) of the two bearing parts (12, 13; 15, 16; 42, 43), said load-bearing roll races extending substantially at right angles to the roll axes, spacer means (2) being provided in order to prevent mutual contact between the load-bearing peripheral surface (3) of adjacently disposed rolls (1), said load-bearing peripheral surface (3) of each roll (1) being disposed in the axial direction of the roll between two space-maintaining peripheral surfaces (2) of said roll (1) which project in a radial direction beyond the load-bearing peripheral surface (3) and which are situated outside the load-bearing roll races (12a, 13a; A12, B12, C12, D12; A13, B13, C13, D13; 42a, 43a), wherein at least one roll end face has a central projection (35) for sliding bearing on a thrust surface (27, 30, 40).

9. A roller bearing arrangement with bearing parts (12, 13; 15, 16; 42, 43) guided in relation to each other by at least one group of rolls (1), each roll (1) having a roll axis and a load-bearing peripheral surface (3) around the roll axis, the load-bearing peripheral surfaces (3) of the rolls (1) futhermore bearing on respective load-bearing roll races (12a, 13a; A12, B12, C12, D12; A13, B13, C13, D13; 42a, 43a) of the two bearing parts (12, 13; 15, 16; 42, 43), said load-bearing roll races extending substantially at right angles to the roll axes, spacer means (2) being provided in order to prevent mutual contact between the load-bearing peripheral surface (3) of adjacently disposed rolls (1), said load-bearing peripheral surface (3) of each roll (1) being disposed in the axial direction of the roll between two space-maintaining peripheral surfaces (2) of said roll (1) which project in a radial direction beyond the load-bearing peripheral surface (3) and which are situated outside the load-bearing roll races (12a, 13a; A12, B12, C12, D12; A13, B13, C13, D13; 42a, 43a), wherein at least one roll end face has an annular projection for sliding bearing on a thrust surface (27, 30, 40).

10. A roller bearing arrangement with bearing parts (12, 13; 15, 16; 42, 43) guided in relation to each other by at least one group of rolls (1), each roll (1) having a roll axis and a load-bearing peripheral surface (3) around the roll axis, the load-bearing peripheral surfaces (3) of the rolls (1) futhermore bearing on respective load-bearing roll races (12a, 13a; A12, B12, C12, D12; A13, B13, C13, D13; 42a, 43a) of the two bearing parts (12, 13; 15, 16; 42, 43), said load-bearing roll races extending substantially at right angles to the roll axes, spacer means (2) being provided in order to prevent mutual contact between the load-bearing peripheral surface (3) of adjacently disposed rolls (1), said load-bearing peripheral surface (3) of each roll (1) being disposed in the axial direction of the roll between two space-maintaining peripheral surfaces (2) of said roll (1) which project in a radial direction beyond the load-bearing peripheral surface (3) and which are situated outside the load-bearing roll races (12a, 13a; A12, B12, C12, D12; A13, B13, C13, D13; 42a, 43a), wherein said bearing parts (15, 16) are arranged for linear movement relative to each other along a displacement axis, and wherein a first one of said bearing parts (15, 16) is provided with at least one closed roll orbit (A, B, C, D) with a load-transmitting row of rolls (A1, B1, C1, D1) parallel with the axis of displacement and with a reverse-running row of rolls (A2, B2, C2, D2), the rolls (1) of the load-transmitting row of rolls (A1, B1, C1, D1) being disposed between respective load-bearing roll races (A13, B13, C13, D13) of the first bearing part (15) and a load-bearing roll race (A12, B12, C12, D12) of a second (16) one of said bearing parts (15, 16), the reverse moving row of rolls (A2, B2, C2, D2) being guided in a return guide (A21, B21, C21, D21) on said first bearing part (15).

11. A roller bearing arrangement according to claim 10, characterised in that the rolls (1) of the load-transmitting row of rolls (A1, B1, C1, D1) have their end faces bearing on thrust surfaces (27) of at least one of the bearing parts (15, 16).

12. A roller bearing arrangement according to claim 10, characterised in that the return guide (A21, B21, C21, D21) consists of a guide channel (A21, B21, C21, D21) on the first bearing part (15), the space-maintaining peripheral surfaces (2) of the rolls (1) bearing on boundary surfaces (28) of this guide channel (A21, B21, C21, D21), the load-bearing peripheral surfaces (3) having no contact with the boundary surfaces (28).

13. A roll bearing arrangement according to claim 10, characterised in that the rolls (1) of the reverse moving row of rolls (A2, B2, C2, D2) have end faces bearing on thrust surfaces (27) on the return guide (A21, B21, C21, D21).

14. A roller bearing arrangement according to claim 10 characterised in that the second bearing part (16) is constituted by a guide rail (16) with a bottom surface (16a), a top surface (16b), two lateral surfaces (16c, 16d) and a plane of symmetry (S) between the two lateral surfaces (16c, 16d) and in that machined into each of the two lateral surfaces (16c, 16d) is a trapezoidal groove (16e) and in that surfaces (16f) of the trapezoidal groove (16e) which converge towards the plane of symmetry (S) form the load-bearing roll races (A12, B12, C12, D12) of altogether four roll orbits (A, B, C, D) and in that the first bearing part (15) consists of, engaging around the guide rail (16), a U-shaped bearing member (15) comprising a web portion (15c) and two flange portions (15a, 15b), the load-bearing roll races (A13, B13, C13, D13) of the bearing member (15) being disposed on inner surfaces (15d, 15e) of the flange portions (15a, 15b) which are opposite the lateral faces (16c, 16d) of the guide rail (16) substantially parallel with the load-bearing roll races (A12, B12, C12, D12) of the guide rail (16).

15. A roller bearing arrangement according to claim 14, characterised in that the trapezoidal grooves (16e) for each load-bearing roll race (A12, B12, C12, D12) of the guide rail (16) have at least one notch (19) to accommodate the space-maintaining peripheral surfaces (2) of the rolls (1) and in that on the inner surfaces (15d, 15e) of the flange portions (15a, 15b) of the bearing member (15) for the rolls (1) of each load-transmitting row of rolls (A1, B1, C1, D1) there is at least one notch (20) for the space-maintaining peripheral surfaces (2) of the rolls (1).

16. A roller bearing arrangement according to claim 14, characterised in that a thrust surface (27) for a load-transmitting row of rolls (A1, B1, C1, D1) is provided on an associated flange portion (15a, 15b) of the bearing member (15) while a further thrust surface (27) is provided on a supporting member (26) bearing 17. A roller bearing arrangement according to claim 16, characterised in that one and the same retaining web (26) has respective thrust surface (27) for the two load-transmitting rows of rolls (A1, B1, C1, D1) associated with a common flange portion (15a, 15b).

18. A roller bearing arrangement according to claim 1, 2, 4, 5, 7, 8, 9 or 10, wherein the axial width of the space-maintaining peripheral surface (2) is substantially less than the axial width of the load-bearing peripheral surface (3).

19. A roller bearing arrangement according to claim 18, wherein the axial width of the space-maintaining peripheral surface (2) is less than 40% of the axial width of the load-bearing peripheral surface (3).

20. A roller bearing arrangement according to claim 19, wherein the axial width of the space-maintaining peripheral surface (2) is less than 20% of the axial width of the load-bearing peripheral surface (3).

21. A roller bearing arrangement according to claim 1, 2, 4, 5, 7, 8, 9 or 10, wherein the radial projection of the space-maintaining peripheral surfaces (2) amounts to less than 30% of the radius of the load-bearing peripheral surface (3).

22. A roller bearing arrangement according to claim 21, wherein the radial projection of the space-maintaining peripheral surfaces (2) amounts to less than 10% of the radius of the load-bearing peripheral surface (3).

23. A roller bearing arrangement according to claim 1, 5, 7, 8, 9 or 10, wherein the space-maintaining peripheral surface (2) is formed by the peripheral surface of a disc attached to a roll end face, said disc being non-rotatably fixed to said roll.

24. A roller bearing arrangement according to claim 1, 2, 4, 5, 7, 8, 9 or 10, wherein the space-maintaining peripheral surface (2) is convex when viewed in an axial sectional plane.

25. A roller bearing arrangement according to claim 1, 2, 4, 5, 7, 8 or 9, wherein the bearing parts (12, 13) are formed by annular parts (12, 13) adapted to rotate relative to each other.

* * * * *

UNITED STATES PATENT AND TRADEMARK OFFICE
CERTIFICATE OF CORRECTION

PATENT NO. : 5,211,483
DATED : May 18, 1993
INVENTOR(S) : Werner Blaurock

It is certified that error appears in the above-identified patent and that said Letters Patent is hereby corrected as shown below:

<u>Title page, [56] References Cited:</u> , under "FOREIGN PATENT DOCUMENTS", the following references should be included:
| | | |
|---|---|---|
| 148860 | 3/1903 | Germany |
| 3707342 | 9/1987 | Germany |
| 3123323 | 1/1983 | Germany |
| 3323536 | 3/1984 | Germany |
| 3620571 | 12/1987 | Germany |

<u>Col. 9, line 55</u>, "first" should read --first (15)--;
<u>Col. 10, line 16</u>, "roll" should read --roller--;
<u>Col. 10, line 60</u>, "bearing" should read --bearing on the associated flange portion (15a, 15b).--.

Signed and Sealed this

Twenty-second Day of February, 1994

Attest:

BRUCE LEHMAN

Attesting Officer     Commissioner of Patents and Trademarks